United States Patent [19]

Kairi et al.

[11] Patent Number: 4,891,927
[45] Date of Patent: Jan. 9, 1990

[54] JOINT FOR CONNECTING WOODEN BEAMS TO EACH OTHER, AND THE USE OF THE JOINT IN ROOF TRUSS STRUCTURES

[75] Inventors: Matti O. Kairi, Hormajärvi; Markku S. Lehtonen, Routio, both of Finland

[73] Assignee: Metsaliiton Teollisuus OY, Espoo, Finland

[21] Appl. No.: 275,678

[22] Filed: Nov. 23, 1988

Related U.S. Application Data

[63] Continuation of Ser. No. 85,318, Aug. 12, 1987, abandoned, which is a continuation of Ser. No. 657,145, Oct. 3, 1984, abandoned.

[30] Foreign Application Priority Data

Oct. 7, 1983 [FI] Finland ............................ 833655

[51] Int. Cl.⁴ .................................................. E04B 1/32
[52] U.S. Cl. ........................................ 52/642; 52/692; 52/693
[58] Field of Search .............. 52/642, 693, DIG. 6, 52/696, 639, 721, 692, 730; 403/283, 285, 405; 411/458, 459, 460, 461, 466, 468, 457

[56] References Cited

U.S. PATENT DOCUMENTS

| | | | |
|---|---|---|---|
| 3,211,043 | 10/1965 | Sanford | 403/405 X |
| 3,276,797 | 10/1966 | Homes, Jr. | 411/458 X |
| 3,281,168 | 10/1966 | Dufficy | 52/642 X |
| 3,423,899 | 1/1969 | Demers | 52/721 |
| 3,485,518 | 12/1969 | Heise | 403/283 X |
| 3,531,904 | 10/1970 | Sanford | 52/642 X |
| 3,605,360 | 9/1971 | Lindal | 52/730 |
| 3,651,612 | 3/1972 | Schmitt | 52/642 X |
| 3,841,195 | 10/1974 | Jureit | 411/459 |
| 4,097,162 | 6/1978 | Lindal | 52/730 X |
| 4,274,241 | 6/1981 | Lindal | 52/642 |
| 4,488,389 | 12/1984 | Farmont | 403/283 X |

FOREIGN PATENT DOCUMENTS 04870 10/1980 Cameroon.
1500643 9/1971 Fed. Rep. of Germany.
2456248 12/1980 France.

OTHER PUBLICATIONS

Abstract in English relating to present invention dated May 17, 1985, re Kerto-Laminated Veneer Lumber Truss.

*Primary Examiner*—Carl D. Friedman
*Attorney, Agent, or Firm*—Cushman, Darby & Cushman

[57] ABSTRACT

A joint in which wooden beams are made up of beam members, located side by side in the longitudinal direction of the beams, and in which beam joint elements, provided with nails, are fitted on the inner surfaces of the beam members in such a way that they do not extend all the way to the outer surface of the beams. The joint may be used in trust structures.

3 Claims, 3 Drawing Sheets

JOINT FOR CONNECTING WOODEN BEAMS TO EACH OTHER, AND THE USE OF THE JOINT IN ROOF TRUSS STRUCTURES

This application is a continuation of Ser. No. 07/085,318, filed Aug. 12, 1987 (now abandoned), which was a continuation of Ser. No. 06/657,145, filed Oct. 3, 1984 (abandoned).

BACKGROUND OF THE INVENTION
1. Field of the Invention

The invention relates to a joint for connecting wooden beam members, which are advantageously made of so-called laminated veneer lumber, to each other. The invention additionally relates to the use of the joint in roof truss structures.

2. Description of the Prior Art

In roof truss structures, the joints between the beams are subject to great stresses. There is usually no torque present, but the tensile and compressive stress loads may be over 20 N/mm$^2$, and thus they may rise up to 20–30 tonnes. It is known to connect the members to each other by means of, for example, nails, bolts or so-called nail plates, the plate having been punched and the "nails" thereby obtained having been turned 90°.

Since, by means of a nailed joint, it is possible to transfer great compressive and tensile forces only by using a considerably large number of nails, there is the risk that the dimensions of the joint elements have to be increased in order to make room for the number of nails required. Furthermore, nailing is almost handwork, and therefore expensive.

Furthermore, these solutions are not good esthetically, which is a factor to be taken into account when the joint will remain visible, for example in the truss structures of large sports halls.

In addition to their outer appearance, their disadvantages include poor fire resistance, since the metal bolts or metal nails on the surface of the structure heat up very rapidly and conduct heat to the inside of the beams. By using these structures it is very difficult to achieve the 1-hour fire-resistance rating often required.

Furthermore, if the nails used are too thick, they break the wood fibers and cause notching.

Since metal does not react to humidity in the same way as wood does, variations in humidity will cause deformations in the area of the joint and produce forces which thereby weaken the joint.

SUMMARY OF THE INVENTION

The object of the present invention is to eliminate the above-mentioned disadvantages of known solutions, by providing a joint which is very strong and which meets the fire-resistance requirements, and which, furthermore, is neat in its outer appearance and in which humidity does not cause deformations, and which is relatively inexpensive and easy to make.

BRIEF DESCRIPTION OF THE DRAWINGS

The invention, and its use in truss structures, is described below in greater detail with reference to the accompanying drawings, in which.

DESCRIPTION OF THE PREFERRED EMBODIMENTS

Figure 1:
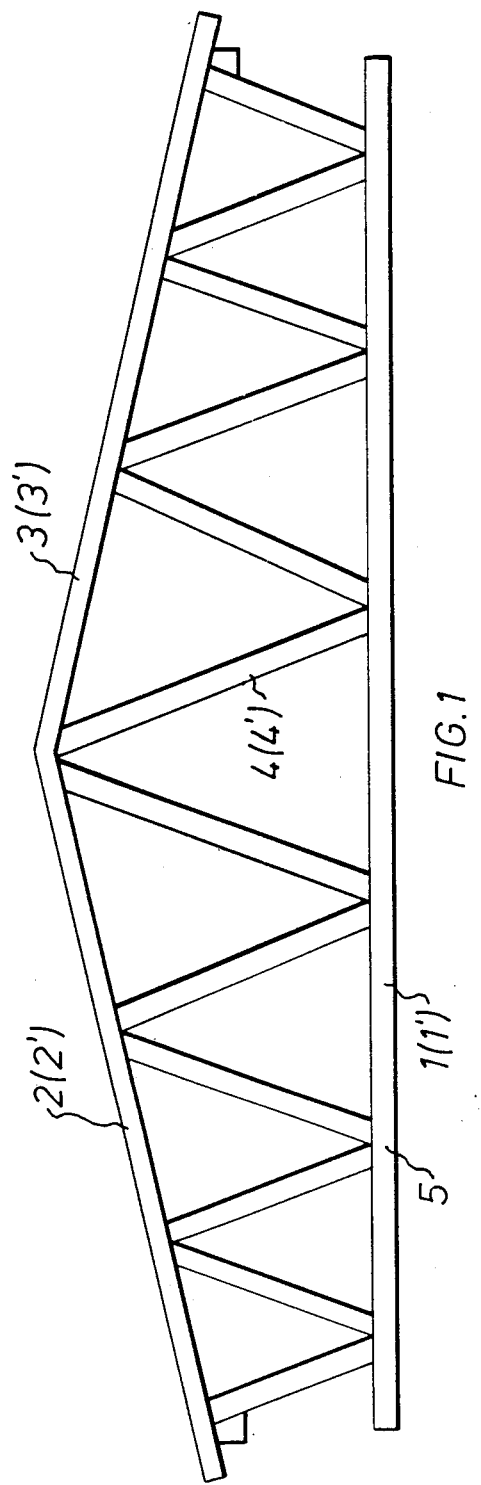
FIG. 1 is an overall representation of a conventional truss structure in front elevation.

FIG. 1 depicts a conventional truss structure. In it, a web structure consisting of beams has been fitted between the bottom chord 1 and the top chords 2 and 3. All the beams are of double-thickness of beams and chords in their longitudinal direction in such a way that, for example, the associated beam 1'(not shown) of the beam 1 is located behind the beam 1 in the figure.

Figure 2:
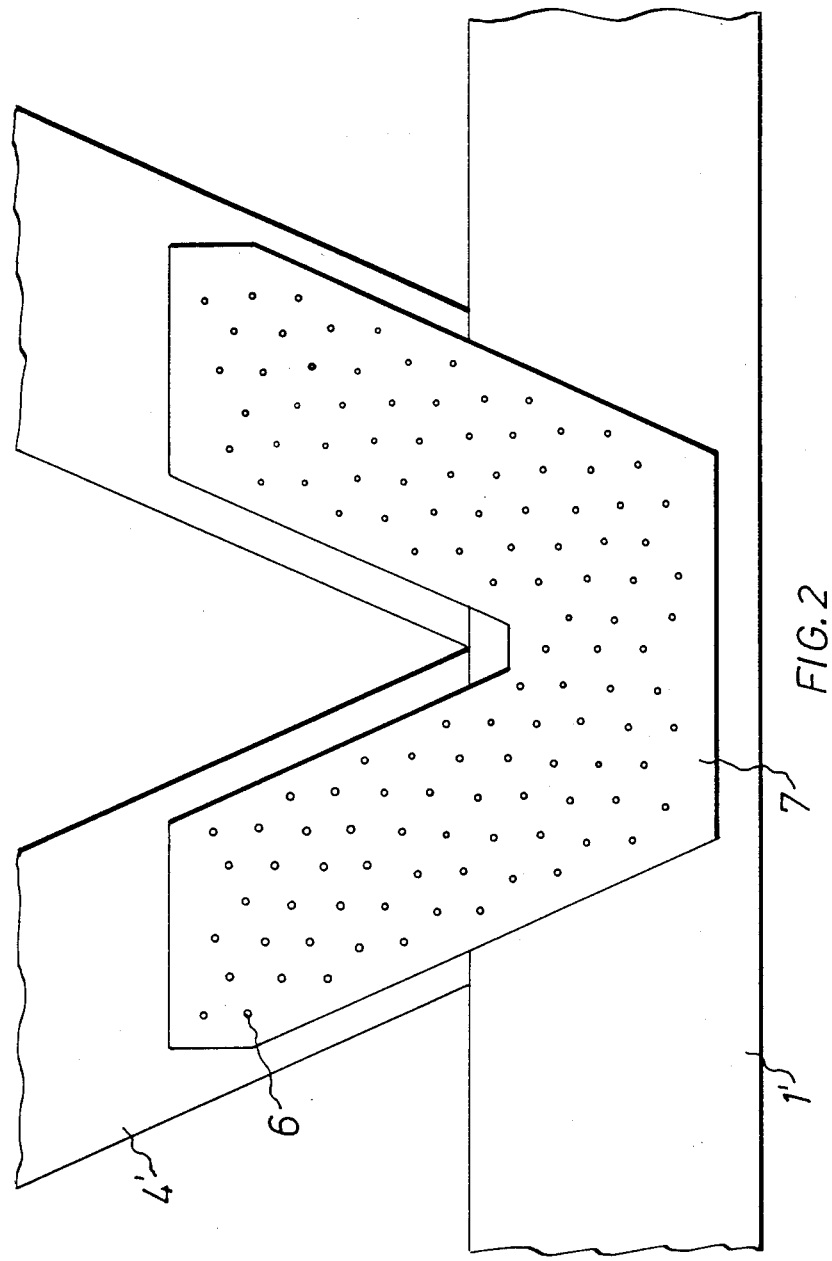
FIG. 2 depicts details of the joint of the truss structure similar to that of FIG. 1, on a larger scale, in fragmentary front elevtion, provided with elements of the present invention.

FIG. 2 depicts one joint 5 between the beams 4 of the web of FIG. 1 and the bottom chord 1. In the figure, the joint 5 has been opened by removing the frontmost beam members 4 and 1 from the double beams, thus exposing the metal joint plate 7 provided with nails 6. Thus, the joint 5 is shown attached only to the other members 1' and 4', although in actual practice, as has been explained above in relation to FIG. 1, another layer, containing elements 1–4, is laminated to the layer of elements 1'–4', in this case by joint plates 7.

By using a rigid joint plate 7, to which nails 6 have been attached in advance by rational work methods, an economical joint element is obtained in which the nail frequency may be considerable. The size of the joint elements are optimized according to their load-bearing capacity.

The number of nails 6 in the joint plate 7 is advantageously about 50 nails/dm$^2$. A depression has been made in the beams 1' and 4', its shape corresponding to the shape of the joint element 7. Furthermore, as the joint element 7 has been dimensioned in such a way that it does not extend all the way to the edges of the beams, it remains completely inside the beams when the frontmost part-beams 4 and 1 are fitted in place. In this manner, i fire-resistant structure in obtained a since the surface has no heat-conducting metal parts.

The joint is thus a rigid plate/nail joint, in which case direct tension and compression are very advantageously transferred in the area of the joint. At the truss-assembling stage, the joint plate remains inside the beam without any special procedures. No protection needs to be provided afterwards.

Figure 3:
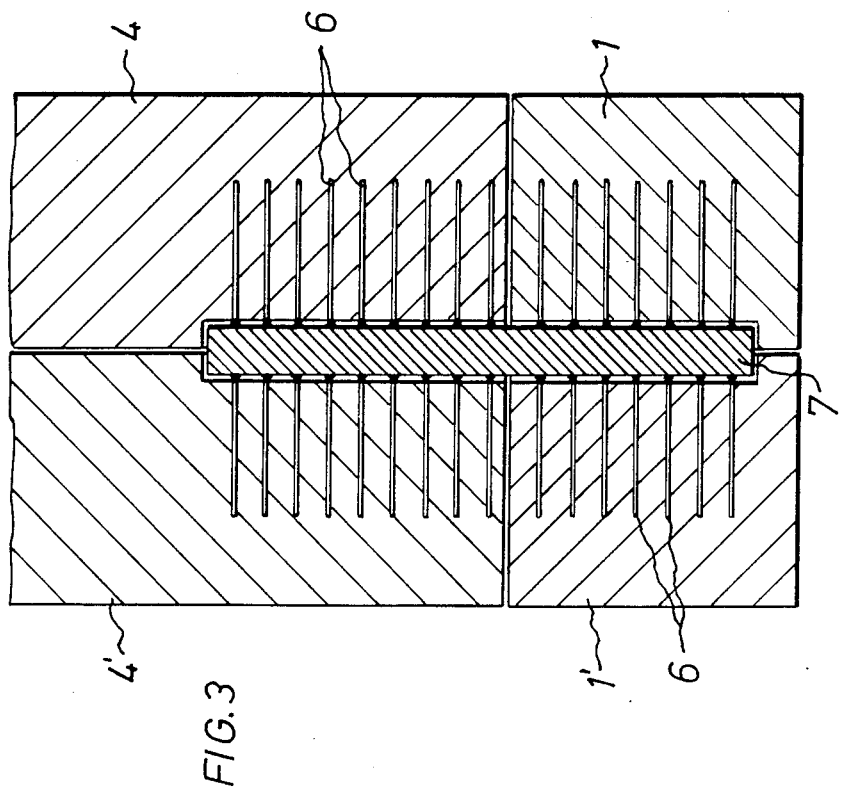
FIG. 3 depicts a fragmentary longitudinal sectional view of the joint of the truss structure shown in FIG. 2.

FIG. 3 is a sectional view of the structure shown in FIG. 2, but showing both layers of wooden elements. (In it, the frontmost beams 1 and 4 have also been fitted in place.) The figure shows how a depression corresponding to the shape of the joint element 7 has been made in the beams 1, 1', 4, 4', in which case the inner sides of the beams, facing each other, fit tightly against each other.

What is claimed is:

1. In a truss which includes a plurality of layers of beams juxtaposed facewise against one another in a transverse direction of the truss, said plurality of layers including a first layer of wooden beams and a second layer of wooden beams juxtaposed facewise against one another so that each of said first and second layers has an inner surface with faces towards and is juxtaposed with a respective other of said second and first layers, and each of said first and second layers has an outer surface which faces away from a respective other of said second and first layers, said inner surfaces extending in respective planes which are longitudinal to said longitudinal direction of said truss, and said beams having edge surfaces which bound and extend between said outer and inner surfaces, said edges therefore extending in said transverse direction of said truss, a joint assembly, comprising:

at least two beams in said first layer meeting at a first intersection;

at least two beams in said second layer meeting at a second intersection corresponding to said first intersection;

recess means formed in said inner surface of said at least two beams in at least one of said first and second layer so as to traverse at least one of said first and second intersections, said recess means terminating short of all of said edges except ones hidden by intersection with others of said edge surfaces in said first and second intersections, and said outer surfaces of said beams in said first and second layers being imperforate throughout where they are disposed in registry with said recess means, in the longitudinal direction of said truss, so that said recess is substantially hidden from view externally of said truss;

a substantially imperforate unitary joint having two opposite faces bounded by and edge;

a plurality of nails having inner ends secured on said plate on opposite sides thereof, so that the nails project outwards from the two opposite faces in the transverse direction of the truss, the nails having free outer ends;

said unitary joint plate being located substantially entirely within said recess means, said inner surfaces of said first and second layers of beams engaging one another facewise substantially completely about the outer periphery of said unitary joint plate, and said nails piercing into corresponding beams of said first and second layers and thereby holding said first and second layers together at said joint, said outer ends of said nails being disposed within corresponding ones of said beams and therefore terminating short of said outer surfaces of corresponding ones of said beams;

said nails being distributed with generally uniform spacing about substantially all of the opposite sides of said unitary joint plate; and said unitary joint plate and nails providing substantially a sole mechanical means fastening said first and second layers of beams together, and respective intersecting beams in each of said first and second intersections of said first and second layers.

2. A beam assembly as in claim 1 wherein the joint members are made of laminated veneer lumber.

3. A joint assembly as in claim 1 wherein the nails have uniform transverse cross sections along their lengths.

* * * * *